July 10, 1928.

O. E. WILTSIE 1,677,009

ADJUSTABLE RELEASING DEVICE

Filed July 11, 1927

Oliver E. Wiltsie
INVENTOR.

BY Charles A. Clark
ATTORNEY.

Patented July 10, 1928.

1,677,009

UNITED STATES PATENT OFFICE.

OLIVER ERNEST WILTSIE, OF TROY, NEW YORK.

ADJUSTABLE RELEASING DEVICE.

Application filed July 11, 1927. Serial No. 204,940.

My invention relates to a device for moving or pulling some object, which device is fixed to the moving mechanism, the said device automatically releasing the attaching means when the pulling force exceeds whatever predetermined force the said device is adjusted to and this invention refers more particularly to the utilization of the same in releasing trailers from tractors.

One object of my invention is to provide a device that will release, uniformly around the horizontal plane of said device, a means attachable thereto and to an object to be moved, when a predetermined pressure is exceeded.

Another object of my invention is to provide a device, automatically releasing an attaching means when a predetermined force is exceeded, that will operate a mechanism or perform some function at a point remote from the said device.

A still further object of my invention is to provide a device, rigidly fixable to a motor driven mechanism, which device contains the minimum number of moving parts and after functioning, readjusts itself automatically for another operation.

It is well known in the art that releasing devices, clevises, automatic release couplings, safety tractor hitches and the like have been used but none of them contemplate the unique combination of novel elements utilized in this particular device which incorporates the minimum number of elements possible to release uniformly around a horizontal plane of the device, any attachable means cooperating with and between a prime mover and an object to be moved.

This invention is an improvement upon the application filed December 23, 1920, Serial Number 432,681, upon which one claim was allowed but as the case was not prosecuted within the time prescribed the case was declared abandoned.

With these and other objects in view, my invention consists of the novel construction, arrangement and formation of parts, hereinafter referred to and described, claimed and substantially as illustrated in the accompanying drawings, wherein similar numerals refer to like parts throughout the several views, in which:

Figure 1:
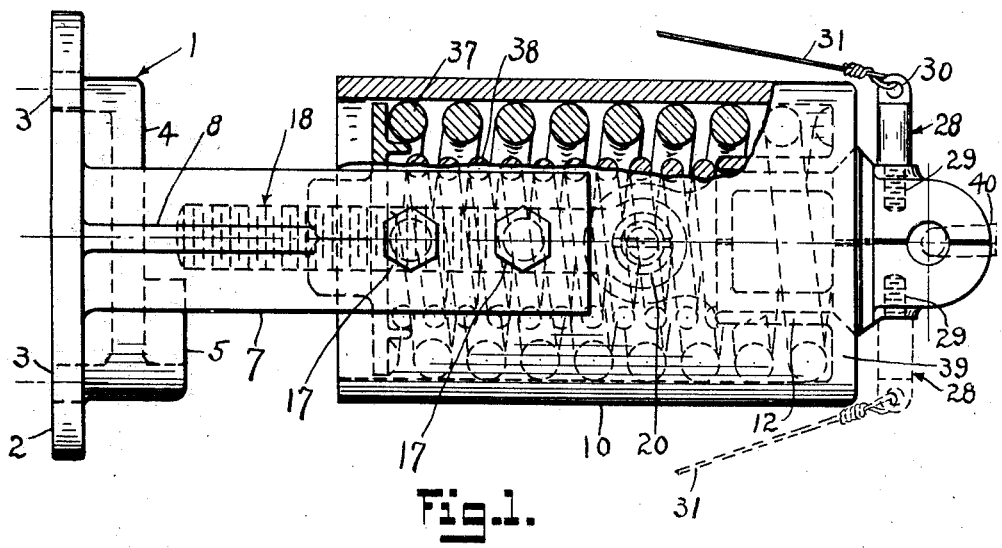
Figure 1 is a side elevation, partly in section of the device.
Figure 2:
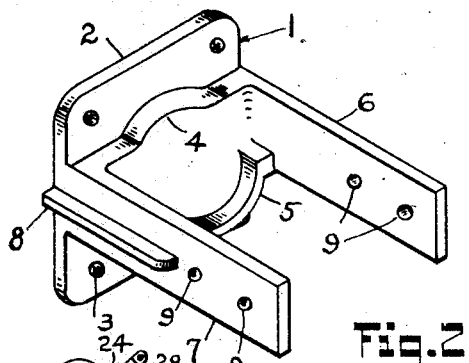
Figure 2 is an isometric view of the bracket.
Figure 3:
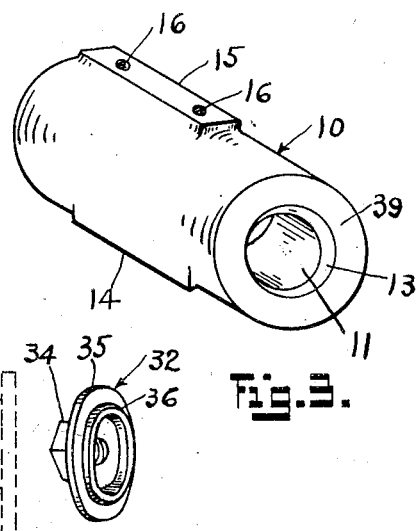
Figure 3 is an isometric view of the cylinder.

The device comprises a bracket, to which is rigidly bolted a cylinder, within which are held, two jaws pivoted to an eyebolt carrying a flanged nut with a circularly arranged rib thereon, locating and guiding two springs adapted to force the eyebolt together with the said jaws into an opening in one end of the said cylinder, thus holding the pivoted jaws together within the said opening by a force dependent upon and governed by the position of the nut upon the eyebolt.

The bracket 1, with a rectangular base 2, provided with bolt holes 3, has a boss 4, a semicircular extension 5, and two arms 6 and 7, each with a rib 8, and bolt holes 9.

Bolted firmly to this bracket 1, is a cylinder 10, having an opening 11, formed by the inwardly projecting portion 12, provided with a beveled edge 13, and on the outside of this cylinder are two bosses 14 and 15, with bolt holes 16, into which are screwed the cap screws 17, as shown in Figure 1, holding the bracket 1, and the cylinder 10, firmly together.

Into this opening 11, there is slidable, an eyebolt 18, with a flattened eye 19, carrying a pivot 20, pivoting two jaws 21 and 22, movably holding the said jaws positioned each side of the eye 19.

Figures 4, 5:
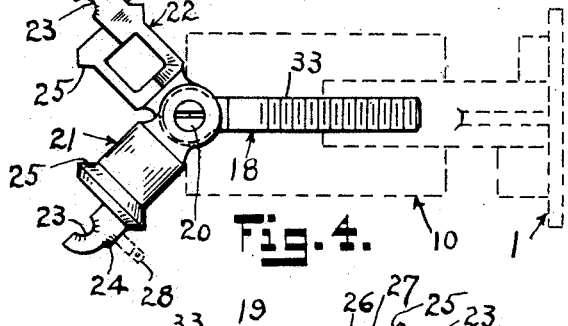
Figure 4 is a side elevation of the jaws and eyebolt in an extended position.
Figure 5 is an isometric view of the flanged circularly ribbed nut.
Figure 6:
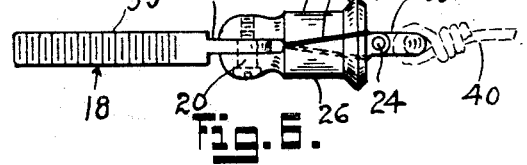
Figure 6 is a plan view of the jaws and eyebolt in the closed position.

Each jaw comprises half an eye 23, with a boss 24 thereon, a bevelled portion 25, a half round portion 26, also each of the said jaws are split diagonally, as shown in Figure 5, by 27, so that each jaw will include a half eye 23.

Into either one or both of the bosses 24, of the jaws 21 and 22, may be screwed the shouldered eye stud 29, having a flattened eye 30, into which may be fastened a rope, wire, or the like 31, adapted to be attached to any object it may be desirable to move at some point remote from the device for some useful purpose.

The eyebolt 18, with the jaws 21 and 22, pivoted thereto by the pivot 20, has a nut 32, adjustable thereon by the thread 33, and this nut with the hexagon head 34, flanged at 35, has a circular rib 36, which separates and positions the springs 37 and 38.

When the eyebolt together with the pivoted jaws are pushed into the hole 11, the spring 38, is placed into position against the part 12, the spring 37, is placed in position against the end of the cylinder at 39, and the nut 32, is screwed on, the other ends of the springs 37 and 38, being positioned, guided and held apart by the circular rib 36, on the flange 35, and it is obvious that any desirable pressure may be obtained within the limits of the two springs by adjusting this nut 32, upon the eyebolt 18.

Normally the spring pressure will hold the said jaws and eyebolt within the hole 11, against the bevelled surface 13, until a force greater than the spring pressure is placed upon these parts, by the rope or attaching means 40, whereupon the jaws and eyebolt and nut will move outwardly until the jaws are clear enough of the hole 11, to allow opening uniformly around their plane of movement enough to release the said attaching means 40, after which the springs will return the parts to their normally closed position.

Having thus described and illustrated the preferred embodiment of my invention, I do not wish to limit myself to the exact construction shown, as modifications may be made therein without departing from the spirit of the invention or scope of the claims.

I claim:—

1. An automatic adjustable releasing device comprising a bracket, attachable to a moving mechanism, rigidly holding a cylinder, an eyebolt carrying a pivot, holding two shouldered jaws thereon, a relatively heavy outer and light inner spring engaging one end of the said cylinder and a flanged circularly ribbed nut, adjustably held upon the said eyebolt.

2. The combination with an automatic adjustable releasing device, of a rigidly supported bracket and cylinder, an eyebolt pivotally carrying two jaws and a flanged circularly ribbed nut engaging two coaxial springs and the springs engaging the end of said cylinder and means directing the said jaws to open uniformly each side of the horizontal plane of the said device upon the application of a force exceeding that of the said springs.

3. The combination with an automatic adjustable releasing device, of a rigidly supported bracket and cylinder, an eyebolt pivotally carrying two jaws, each provided with means for moving an object at some remote point, and a flanged circularly ribbed adjustable nut engaging two coaxial springs and the springs engaging the end of the said cylinder and means directing the said jaws to open uniformly each side the horizontal centerline of the said device upon the application of a force exceeding that of the said springs.

4. The combination with an automatic adjustable releasing device, of a bracket and cylinder with means for rigidly attaching to a moving mechanism, an eyebolt pivotally carrying a pair of interengaging jaw members with attaching means thereon, adapted to be held in a closed position by adjustable spring means and to fit within means integral with the said cylinder, said means directing the jaw members to open uniformly around the horizontal plane of the said device upon the application of a force in excess to that of the said spring means and means attachable to the said jaw or jaws for moving an object at some remote point.

Signed at Troy, N. Y., in the county of Rensselaer, and State of New York, this 7th day of July, 1927.

OLIVER ERNEST WILTSIE.